United States Patent [19]

Casalone

[11] Patent Number: 4,467,704
[45] Date of Patent: Aug. 28, 1984

[54] VEHICLE BRAKE UNIT

[75] Inventor: Enrico Casalone, Turin, Italy

[73] Assignee: WABCO Westinghouse Compagnia Freni S.p.A., Turin, Italy

[21] Appl. No.: 441,351

[22] Filed: Nov. 15, 1982

[30] Foreign Application Priority Data

Nov. 26, 1981 [IT] Italy ............................... 68539 A/81

[51] Int. Cl.³ ................................................ F16J 1/10
[52] U.S. Cl. ........................................ 92/129; 74/110; 188/343
[58] Field of Search .............. 92/129; 188/106 F, 343; 74/110

[56]  References Cited

U.S. PATENT DOCUMENTS

| 1,814,632 | 7/1931 | Rohr | 74/110 |
| 2,082,334 | 6/1937 | Harcourt | 74/110 |
| 3,043,228 | 7/1962 | Bennett | 92/129 |
| 3,170,322 | 2/1965 | Cavanaugh | 74/110 |

FOREIGN PATENT DOCUMENTS

| 1680381 | 3/1968 | Fed. Rep. of Germany . | |
| 2147435 | 3/1973 | Fed. Rep. of Germany | 188/343 |
| 2266055 | 3/1975 | France . | |
| 2435376 | 9/1979 | France . | |

Primary Examiner—Paul E. Maslousky
Attorney, Agent, or Firm—Gary J. Falce

[57]  ABSTRACT

A vehicle brake unit having a fluid pressure operated piston arranged perpendicular to a brake push rod on which is provided a pair of diagonally opposed roller members. An actuator member is connected to the piston and is interposed between the piston and push rod to translate the force of the piston to the push rod. A thrust surface having a cam profile is engageable with the roller members of the push rod, while a reaction surface is engageable with the brake unit housing. The actuator reaction surface is convex and the complementary thrust surface of the housing is concave, thereby providing a pivot point about which the actuator is angularly rotated when the piston is operated to establish a brake stroke of the brake push rod.

12 Claims, 3 Drawing Figures

VEHICLE BRAKE UNIT

BACKGROUND OF THE INVENTION

The present invention relates to a brake unit operated by a fluid under pressure in order to apply braking force to the wheels of a railway car.

In particular, the invention relates to a type of brake unit in which a fluid pressure operated piston acts via an actuator device to displace a brake push rod that moves in a direction perpendicular to the motion of the piston to control a brake shoe that is engageable with a wheel of the railway car.

In known arrangement, the actuator device is a wedge-shaped member that is bifurcated to straddle the thrust rod and is attached to the piston to move with it. Each segment of the bifurcated cam member has a reaction surface that interacts with a reaction roller that is rotatably mounted on the housing and an inclined thrust surface that interacts with a thrust roller that is rotatably mounted on the brake push rod.

SUMMARY OF THE INVENTION

The object of the present invention is to provide an improved actuator arrangement that makes possible a brake unit that is more efficient in operation, requires less space, and is easier to service and maintain.

The objective is achieved by arranging the actuator device to move angularly in response to operation of the fluid pressure operated piston, essentially around an axis that is perpendicular to movement of the piston and thrust rod. By providing the thrust surface of the actuator with a cam-shaped profile and properly dimensioning the related thrust surfaces, a higher amplification ratio of the force imparted by the piston to the thrust rod is obtained, while at the same time reducing the angle of application of this force with respect to the axis of the thrust rod.

According to a further aspect of the invention, the thrust surfaces of the cam-shaped actuator are preferably formed with a profile that produces a rapid initial movement of the thrust shaft during a braking stroke.

According to still another aspect of the invention, the reaction surfaces of the cam-shaped actuator and the complementary reaction surfaces of the housing are formed respectively with convex and concave curvatures, the radius of curvature of the concave reaction surfaces being greater than that of the convex reaction surfaces. This arrangement accomodates the angular motion of the cam-shaped actuator by direct rolling contact with the housing and thus eliminates the need for rollers or other intermediary devices. This makes it possible to decrease the number of parts of the brake unit and thus significantly simplifies its manufacture, assembly and maintenance.

BRIEF DESCRIPTION OF THE DRAWINGS

These and other objects and attendant advantages will appear from the following description and operation when taken with the drawings in which.

DESCRIPTION AND OPERATION

Figure 1:
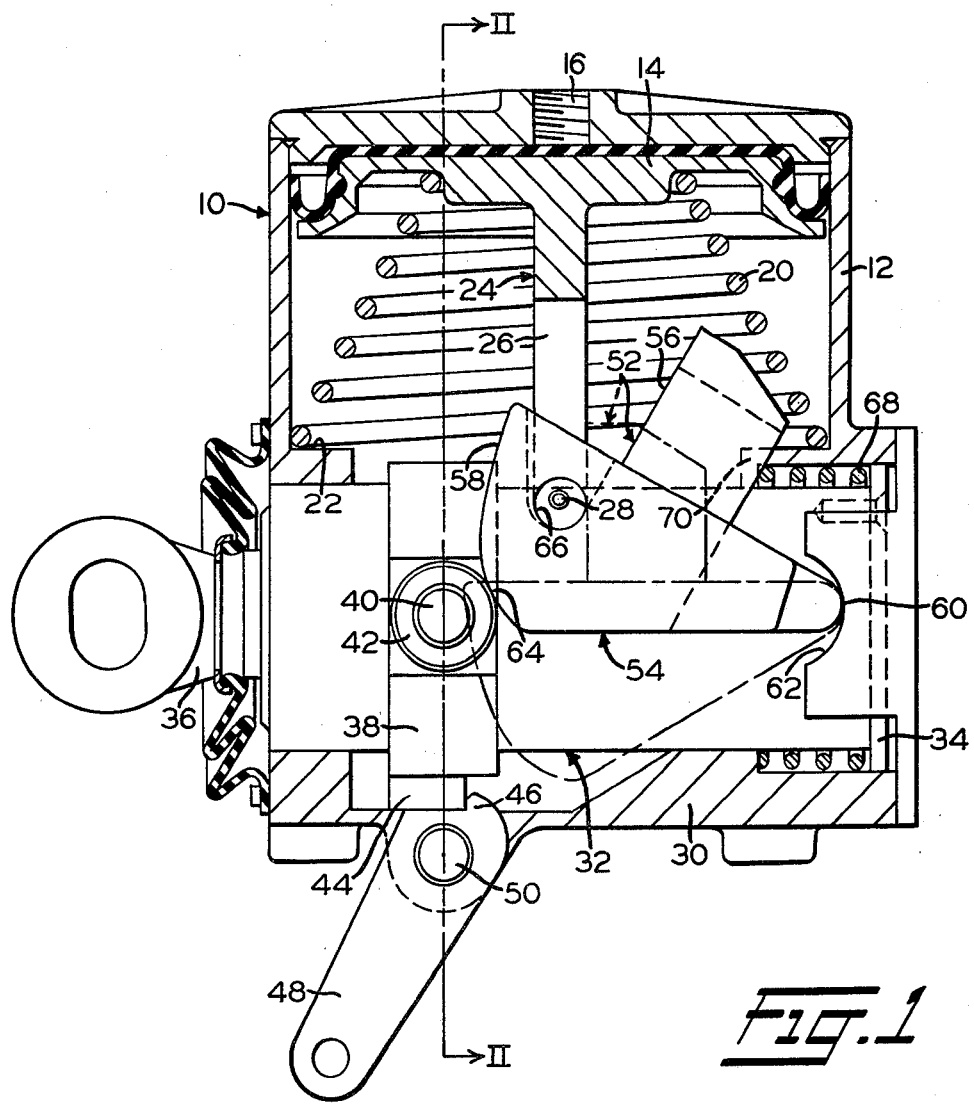
FIG. 1 is a cross-sectional assembly view of a brake unit according to the invention.

Referring to the drawings, a housing 10 is shown having a substantially cylindrical shape and arranged to be fastened to a supporting structure of a railroad vehicle, near one of its wheels, not shown. In the following description the terms upper and lower, vertical and horizontal etc. refer to the installed position of the housing 10 on a railroad vehicle, which corresponds to the position shown in the drawings. It is clear, however, that the unit can also be installed in other positions.

The upper part of the housing 10 defines a cylinder 12 in which a fluid pressure actuated piston 14 is reciprocably disposed. The upper part of the cylinder 12, that is the part between the piston 14 and the top of the housing 10, is provided with an opening 16, to which a source of fluid under pressure, e.g. compressed air, may be connected.

Figure 2:
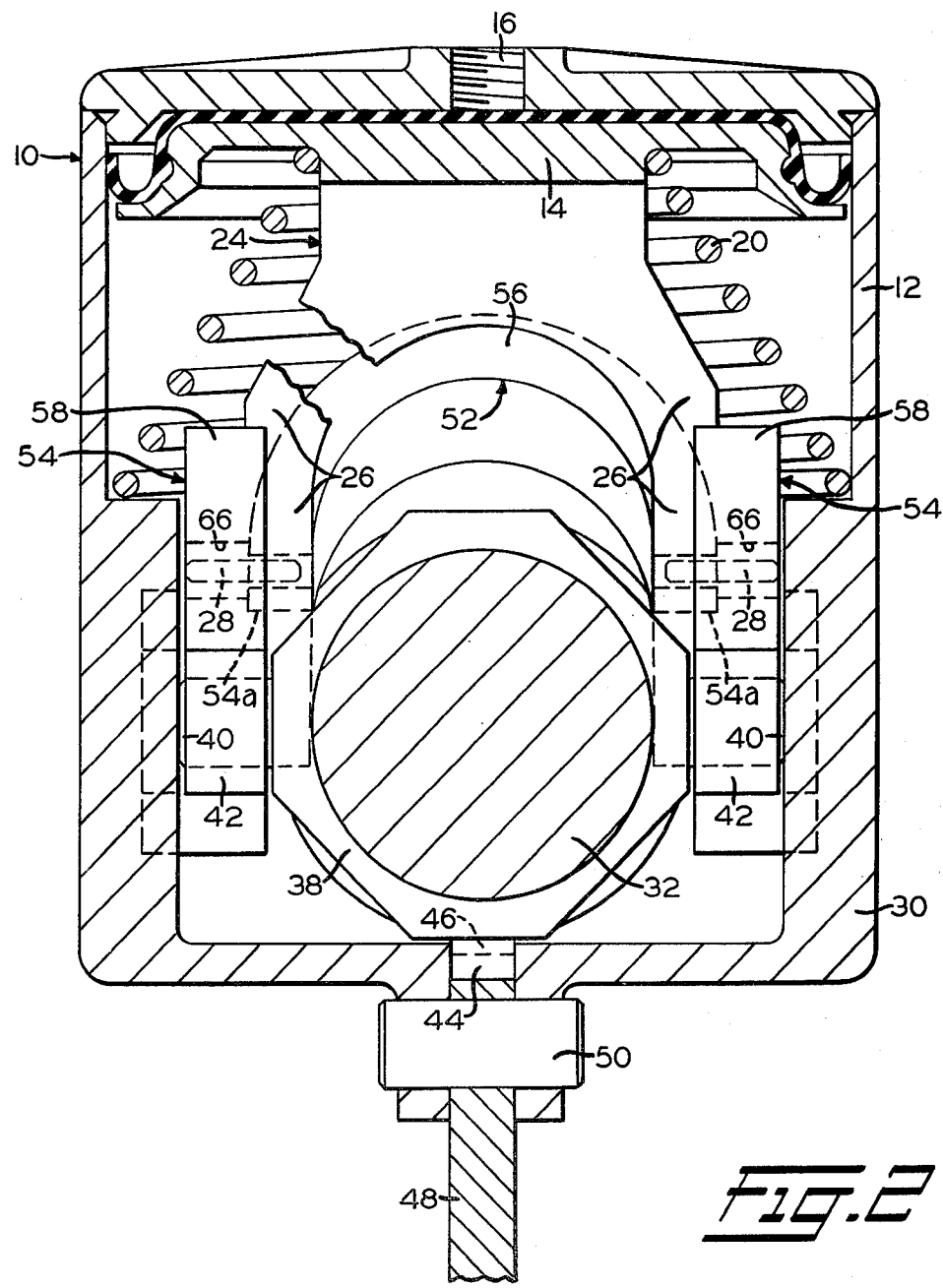
FIG. 2 is a partial cross-sectional view taken along the lines II—II of FIG. 1.

In the lower part of the cylinder 12 is housed a tapered helical compression spring 20, the smaller end of which rests against the piston 14 and the larger end of which rests against an annular flange 22 located at the base of the cylinder 12. Attached to the center of the lower face of piston 14 is a drag link 24, which as seen in FIG. 2, has the general shape of a fork. Drag link 24 has, in the lower part, a pair of separated, parallel arms 26, which extend parallel to the axis of the cylinder 12. Arm 26 is provided with a transverse pin 28, which protrudes laterally and outwardly.

In the lower part 30 of housing 10, a movable thrust rod 32 is arranged, with its axis placed perpendicular to that of the cylinder 12, and therefore to the direction of movement of the piston 14. The thrust rod 32 exhibits at one end an annular support collar 34 and on the other side a connecting rod 36, which extends laterally outside the housing 10 and is used in the known way for connection to a brake shoe or pad, not shown. The brake shoe is able to interact with the peripheral surface of the wheel of the railroad car to provide friction braking of the vehicle.

The thrust shaft 32 is also provided, at an internal location of the housing 10 and at a short distance from the connecting rod 36, with an annular collar 38, which laterally supports a pair of diagonally aligned pins 40 placed perpendicularly to the axis of the shaft 32. Each pin 40 carries a cylindrical roller 42, which is capable of rotation thereon.

In addition, the collar 38 is equipped, in the lower part, with a projection 44 that is able to interact, in the manner described below, with a rounded tooth 46 formed at one end of an external lever 48. A pin 50 parallel to the two pins 40 pivotally supports lever 48 at the base of housing 10.

A cam member 52 is connected to the drag link 24 and interacts with the thrust rod 32. Cam member 52 is bifurcated to form two sectors 54 on opposite sides with respect to the shaft 32. Sectors 54 are rigidly interconnected by a curved yoke 56.

Each of the sectors 54 is made up of a vertical plate and having an essentially triangular shape with a base 58 and a vertex 60 opposite to the base 58 forming respectively, a thrust surface and a reaction surface. The reaction surface 60 of each sector 54 is convex and rests, by way of rolling contact, on a complementary reacting surface 62 of the housing 10, which is in the form of a recess having a radius of curvature greater than that of the reaction surface 60. This allows each sector 54, and therefore the cam member 52, to move angularly, essentially around an axis passing through the contact point between the reaction surfaces 60 and 62. This axis is perpendicular to the axis of the piston 44 and to the axis of the thrust shaft 32 and intersects the latter during the rolling of the surfaces 60 with respect to the surfaces 62.

The profile of the thrust surface formed by base 58 of each sector 54 has a generally curved shape, the center of which is shifted behind and above the cam member 52. Each thrust surface provided by base 58 is in contact with the lateral surface of a respective roller 42, which constitutes a complementary thrust surface.

Figure 3:
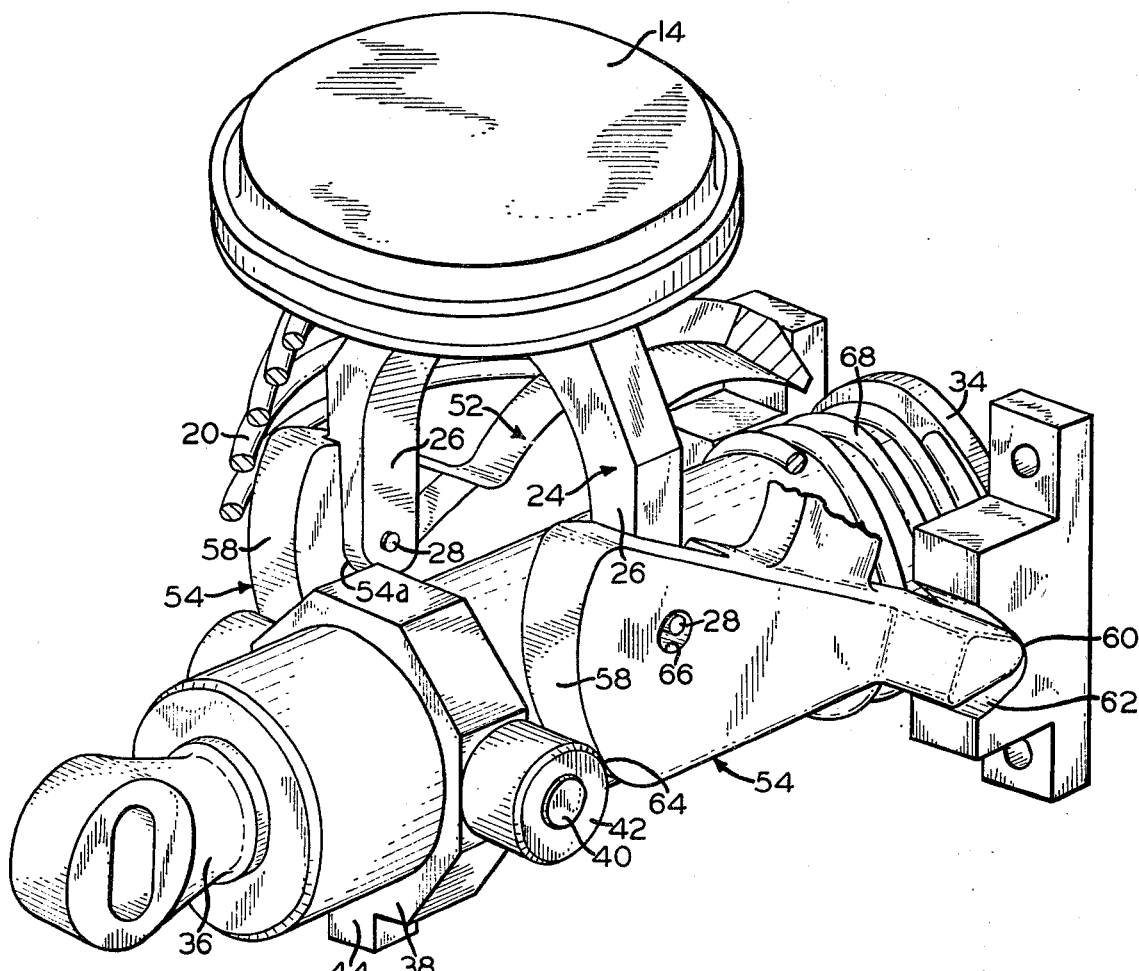
FIG. 3 is a perspective view showing the internal workings of the brake unit of the invention.

In addition, as FIG. 1, shows in detail each reaction surface of 58 may exhibit a sharply inclined section 64, the function of which, as will be shown later, is to achieve a fast initial motion of the thrust rod during the application stroke, in order to bring the brake shoes into wheel engagment with a minimum of piston movement. As clearly shown in FIG. 3, each of the arms 26 of the drag link 24 rests on the bottom of a corresponding lateral seat 54a of one of the two sectors 54 of the cam mechanism 52.

The connection between the cam mechanism 52 and the drag link 24 is achieved by the two lateral pins 28, each of which is placed with clearance in a corresponding hole 66 drilled in a corresponding sector 54, in the vicinity of the central zone of the thrust surface 58.

This connection could be achieved in a different way, for example, flexibly, by means of elastomer elements.

A helical compression spring coaxially wrapped around the end of the shaft 32 opposite the connection rod 36 has one of its ends against the annular collar 34 and the other one against an annular support surface 70 of the housing 10.

The operating description of the braking unit according to the invention, follows:

In FIG. 1, a continuous line shows the unit in a resting position, which corresponds to the absence of pressure in the upper part at the cylinder 12. In this position, the piston 14 and the cam mechanism 52 are in a raised position, with the sharply inclined section 64 of thrust surface 58 in contact with the lateral surfaces of the two rollers 42 and the thrust rod 32 in the retracted position.

By introducing a fluid under pressure to the upper part of the cylinder 12, through the passage 16, the braking travel of the thrust rod 32 is obtained, that is, the moving of the brake shoe carried by the connecting rod 30. In this case, the action of the fluid under pressure causes the piston 14 and the drag link 24, to move downward, and by means of the arms 26 resting on the lateral parts 54a, the consequent angular movement of the cam member 52 toward the lower position shown in FIG. 1 by a broken line. Because of this angular rotation of cam member 52, the thrust rod 32 is displaced axially outward, pushing the connecting rod toward the wheel.

Due to the sharp incline 64, there is an initial rapid movement of the brake shoe toward the wheel during initial rotation of cam member 52. The brake shoe travel subsequently proceeds as a result of the interaction between the reaction surfaces 58 of the sectors 54 and the lateral surfaces of the rollers 42, thus obtaining a more gradual braking action.

By reducing the pressure in the upper part of the cylinder 12, the piston 14 and the cam member 52 return toward the rest position, due to the action of the spring 20, and the consequent retraction of the rod 32 and thus of the brake shoe due to the action of the spiral spring 68.

The lever 48 can be used as a hand brake or a parking brake. To achieve this, it is sufficient to turn the lever 48 counterclockwise with reference to FIG. 1, thereby causing the shifting of the thrust shaft 32 and consequently the approach of the braking shoe to the wheel due to the interaction between the tooth 46 and the projection 44 of the collar 38. From the preceding description it is clear that the design of the brake unit according to the invention, and in particular the structure of the cam member 52, the configuration of the trust surfaces 60 and 62, and the position of the return spring 68, make the unit particularly compact, relatively small and easy to build.

Of course keeping the idea of the invention intact, the building details and shape can vary greatly from what has been described and illustrated, without going beyond the scope of their invention. Thus, for example, it is clear that it would be possible to introduce variations in the geometrical shape of the thrust surface of sectors 58 in order to change the path of the shaft 32 and the amount of thrust transmitted to it, and also to change the profile of the reaction surfaces 60 and 62.

In addition, to eliminate undesirable vibrations and relative movements, each of the two sectors 54 of the cam mechanism 52 could be attached to the housing 10 with a flexible coupling, for example with elastomer ties or similar elements which tend to push the reacting surfaces 60 against the corresponding complementary reaction surfaces 62.

Having thus described the invention, what I claim as new and desire to secure by Letters Patent, is:

1. A brake unit for a railway vehicle comprising:
  (a) a housing;
  (b) a cylinder formed in said housing;
  (c) a piston reciprocably disposed in said cylinder;
  (d) a thrust rod arranged in said housing to move axially in a direction perpendicular to the direction of movement of said piston;
  (e) actuator means for effecting said axial movement of said thrust rod in response to operation of said piston, said actuator means including a cam member comprising:
    (i) a thrust portion having a cam surface engageable with a complementary thrust portion of said thrust rod, said cam surface having a curved profile provided by a first radius of curvature forming a sharply inclined section engageable with said thrust portion of said thrust rod during initial operation of said piston in one direction and at least one different radius of curvature forming a less sharply inclined section engageable with said thrust portion of said thrust rod during operation of said piston in said one direction subsequent to said initial operation;
    (ii) a connection with said piston; and
    (iii) a reaction portion pivotally engageable with a complementary reaction portion of said housing to provide angular rotation of said cam member.

2. A brake unit as recited in claim 1, further characterized in that the axis of rotation of said cam member is perpendicular to the direction of movement of said piston and said thrust rod.

3. A brake unit as recited in claim 1 wherein said cam member is bifurcated to form sectors disposed on opposite sides of said thrust rod, said sectors being interconnected by a rigid web therebetween.

4. p A brake unit as recited in claim 3, wherein said sectors are essentially triangular in shape with a base and vertex providing said thrust and reaction portions respectively.

5. A brake unit as recited in claim 4, wherein said connection between said piston and said cam member is at a point intermediate said thrust and reaction portions of said cam member.

6. A brake unit as recited in claim 5, wherein said connection between said piston and said cam member comprises:
 (a) a drag link projecting from said piston; and
 (b) means for pivotally connecting said drag link to said cam member.

7. A brake unit as recited in claim 6, wherein said drag link is bifurcated, each arm of said bifurcation having a pin pivotally connected with a respective one of said sectors.

8. A brake unit as recited in claim 7, wherein said thrust rod includes a pair of diagonally opposed roller members, each said roller member being disposed adjacent said curved thrust portion of a respective one of said sectors of said cam member.

9. A brake unit as recited in claim 8, wherein said housing comprises a pair of recesses, each said recess being disposed adjacent said curved vertex of said reaction portion of a respective one of said sectors of said cam member.

10. A brake unit as recited in claim 9, further comprising means for urging said piston toward a retracted position wherein said cam member is rotated so as to locate said sharply inclined secton of said cam member adjacent said roller members.

11. A brake unit as recited in claim 10, further comprising means for urging said thrust rod in a direction to establish said engagement of said cam member with said roller members.

12. A brake unit as recited in claim 1, wherein said reaction portion of said housing is concave in shape and said reaction portion of said cam member is convex, said concavity having a larger radius of curvature than said convexity to provide rolling contact between said reaction portions of said cam member and said housing.

* * * * *